(12) United States Patent
Andrews et al.

(10) Patent No.: US 6,319,053 B1
(45) Date of Patent: *Nov. 20, 2001

(54) BATTERY VIBRATION CONTROL APPARATUS

(76) Inventors: Jonathan Neal Andrews, 1855 NW. 8th St., McMinnville, OR (US) 97128; Stephen V. Cooper, 6006 Rice La., Amity, OR (US) 97101

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,661

(22) Filed: Nov. 13, 1998

(51) Int. Cl.$^7$ .................................................. H01R 3/00
(52) U.S. Cl. ........................ 439/500; 439/247; 320/112
(58) Field of Search .................... 439/500, 247, 439/248; 320/112, 113; 429/96–100, 170

(56) References Cited

U.S. PATENT DOCUMENTS

| | | | |
|---|---|---|---|
| D. 295,739 | 5/1988 | Lanci et al. | D13/5 |
| D. 372,456 | 8/1996 | Cooper et al. | D13/108 |
| D. 375,482 | 11/1996 | Andrews | D13/103 |
| 4,075,402 | * 2/1978 | Okamoto | 439/500 |
| 4,129,688 | * 12/1978 | Fischer et al. | 439/500 |
| 4,580,862 | * 4/1986 | Johnson | 439/248 |
| 4,909,748 | * 3/1990 | Kozono et al. | 439/247 |
| 5,111,148 | 5/1992 | Senoo et al. | 324/433 |
| 5,173,061 | * 12/1992 | Comerci et al. | 439/536 |
| 5,183,714 | 2/1993 | Mitsui et al. | 429/123 |
| 5,200,686 | 4/1993 | Lee | 320/2 |
| 5,216,371 | 6/1993 | Nagai | 324/428 |
| 5,224,870 | 7/1993 | Weaver et al. | 439/157 |
| 5,227,262 | 7/1993 | Ozer | 429/98 |
| 5,248,927 | 9/1993 | Takei et al. | 320/2 |
| 5,325,263 | * 6/1994 | Singer et al. | 439/248 |
| 5,350,317 | 9/1994 | Weaver et al. | 439/500 |
| 5,415,947 | 5/1995 | Mitsui et al. | 429/1 |
| 5,438,248 | 8/1995 | Hyuck | 320/15 |
| 5,470,343 | 11/1995 | Fincke et al. | 607/5 |
| 5,483,165 | 1/1996 | Cameron et al. | 324/427 |
| 5,510,205 | 4/1996 | Ozer | 429/91 |
| 5,573,870 | 11/1996 | Andrews | 429/96 |
| 5,575,807 | 11/1996 | Faller | 607/5 |
| 5,602,454 | 2/1997 | Arakawa et al. | 320/2 |
| 5,625,291 | 4/1997 | Brink et al. | 324/427 |
| 5,626,979 | 5/1997 | Mitsui et al. | 429/97 |
| 5,640,078 | 6/1997 | Kou et al. | 320/15 |
| 5,658,316 | 8/1997 | Lamond et al. | 607/5 |
| 5,694,019 | 12/1997 | Uchida et al. | 320/6 |
| 5,721,482 | 2/1998 | Benvegar et al. | 320/43 |
| 5,729,115 | 3/1998 | Wakefield | 320/2 |
| 5,741,305 | 4/1998 | Vincent et al. | 607/5 |
| 6,093,056 | * 7/2000 | Donauer et al. | 439/500 |

OTHER PUBLICATIONS

Panasonic Omni/Movie Video Camera belongs to US Patent Examiner T.C. Patel in AU2839 who bought the Video Camera in 1987 for personal use.*

Individual Specifications "LC–TA122P(a)", Panasonic Sealed Lead Acid Handbook, p. 52, Aug. 1998.*

Panasonic OmniMovie Video Camera belongs to US Patent Examiner T.C. Patel in AU2839 who bought the Video Camera in 1987 for personal use.*

* cited by examiner

Primary Examiner—Brian Sircus
Assistant Examiner—Hae Moon Hyeon

(57) ABSTRACT

A multi-axis restraining system for releasably restraining a battery pack installed in an instrument battery pocket such that the battery terminals and instrument contacts are rigidly secured to each other. The instrument contacts are loosely mounted within the instrument so that they may float, traveling with the battery pack in response to shocks and vibration. The present invention significantly eliminates relative motion between the battery terminals and instrument contacts, substantially eliminating welding and fretting of the contacts and terminals. The present invention is particularly beneficial in instruments such as defibrillators which require reliable and efficient use of the battery power.

11 Claims, 5 Drawing Sheets

BATTERY VIBRATION CONTROL APPARATUS

RELATED APPLICATIONS

This application is related to the following commonly owned applications, some of which share a common specification:

U.S. Utility Patent Application entitled "Battery Pack Chemistry Detection and Identification System and Method," filed concurrently herewith, and naming as inventors Jonathan Neal Andrews and Gregory D. Brink; and U.S. Utility patent application Ser. No. 09/192,116 entitled "System and Method for Detecting Battery Pack Components," filed concurrently herewith, and naming as inventors Jonathan Neal Andrews, Gregory D. Brink and David Lynn Burton.

BACKGROUND OF THE INVENTION

1. Field of the Invention

The present invention relates generally to batteries for use in portable devices and, more particularly, to controlling unintended motion of batteries installed in such devices.

2. Related Art

Sudden cardiac arrest, i.e., a heart attack, has been attributed to over 350,000 deaths each year in the United States, making it one of the country's leading medical emergencies. Worldwide, sudden cardiac arrest has been attributed to a much larger number of deaths each year. One of the most common, and life threatening, consequences of a heart attack is the development a cardiac arrhythmia commonly referred to as ventricular fibrillation. When in ventricular fibrillation the heart muscle is unable to pump an sufficient volume of blood to the body and, more importantly, to the brain. Ventricular fibrillation is generally identifiable by the victim's immediate loss of pulse, loss of consciousness and a cessation of breathing. The lack of blood and oxygen to the brain may result in brain damage, paralysis or death to the victim.

The probability of surviving a heart attack or other serious heart arrhythmia depends on the speed with which effective medical treatment is provided. There are four critical components of effective medical treatment that must be administered to a victim of sudden cardiac arrest: (1) early cardiopulmonary resuscitation to keep the blood oxygenated and flowing to the victim's brain and other vital organs; (2) early access to emergency care; (3) early cardiac defibrillation to restore the heart's regular rhythm; and (4) early access to advanced medical care. If prompt cardiopulmonary resuscitation is followed by defibrillation within approximately four minutes of the onset of symptoms, the victim's chances of surviving sudden cardiac arrest can approach or exceed forty percent. Prompt administration of defibrillation within the first critical minutes is considered one of the most important components of emergency medical treatment for preventing death from sudden cardiac arrest.

Cardiac defibrillation is an electric shock that is used to arrest the chaotic cardiac contractions that occur during ventricular fibrillation and to restore a normal cardiac rhythm. To administer this electrical shock to the heart, defibrillator pads are placed on the victim's chest, and an electrical impulse of the proper size and shape that is administered to the victim in the form of an electric shock. While defibrillators have been known for years, they have typically been large and expensive making them unsuitable for use outside of a hospital or medical facility.

More recently however, portable external defibrillators for use by first responders have been developed. A portable defibrillator allows proper medical care to be given to a victim earlier than preceding defibrillators increasing the likelihood of survival. Such portable defibrillators may be brought to or stored in an accessible location at a business, home, aircraft or the like, ready for use by first responders. With recent advances in technology, even a minimally trained individual can operate conventional portable defibrillators to aid a heart attack victim in the critical first few minutes subsequent to onset of sudden cardiac arrest.

Portable defibrillators require an energy source other than an alternating current source to operate in the anticipated environment. Although several manufacturers have provided speciality battery packs for their defibrillation units, typically, such portable defibrillators use a standard, commonly available, rechargeable battery pack, such as those used in video camcorders. Conventional defibrillators use standard mechanical and electrical adapters to mechanically and electrically connect the battery pack to the defibrillator. The use of popular battery packs allows for the easy and inexpensive purchase of replacement batteries when needed. Generally, battery packs may include a sealed lead acid (SLA) battery, a nickel cadmium battery, a lithium battery or the like.

When installed, the electrical connection between the battery contacts and the device must be maintained under the anticipated operational conditions. Portable defibrillators are roughly handled, stored for long periods of time and are subject to all types of shock and vibration depending on where they are stored and the manner in which they are transported to the patient. For example, the electrical connection between the battery terminals and the defibrillator contacts must not be loose or capable of being separated during use. A loose connection between the battery and the defibrillator can decrease battery life or cause the generation of false defibrillator status indications. Such poor connections may also cause improper battery charging or unnecessary maintenance to be performed on the instrument. Micro-motion of the battery pack also may cause arcing, resulting in contact and terminal welding or fretting (that is, pitting and erosion) due to such arcing.

One conventional attempt to circumvent this problem has been to use chemical coatings on the battery contacts to prevent arcing. Drawbacks associated with the use of such coatings has been their high cost and propensity to wear with extended use. This is particularly problematic in defibrillators and other medical support devices that must perform reliably despite being used in environments that subject them to frequent shock and vibration.

Another conventional approach has been to rigidly connect the battery to the instrument. However, battery packs are generally manufactured to high tolerances. As a result, conventional techniques for rigidly attaching the battery pack to the instrument are complex and bulky. Accordingly, such techniques are impractical to manufacture and install in portable devices, particularly portable defibrillators which must provide the operator with the ability to quickly and easily replace the battery.

What is needed, therefore, is an apparatus for ensuring the proper and continuous connection between battery terminals and the instrument contacts so as to prevent arcing. Such an apparatus should not interfere with the operator's ability to replace the battery.

SUMMARY OF THE INVENTION

The present invention is a multi-axis restraining system for releasably restraining a battery pack installed in an instrument battery pocket such that the battery terminals and instrument contacts are rigidly secured to each other. The instrument contacts are loosely mounted within the instrument so that they may float, traveling with the battery pack in response to shocks and vibration. Importantly, the present invention significantly eliminates relative motion between the battery terminals and instrument contacts, substantially eliminating welding and fretting of the contacts and terminals. The present invention is particularly beneficial in instruments such as defibrillators which require reliable and efficient use of the battery power.

In one aspect of the invention, a battery interface adapter for use in an instrument battery pocket is disclosed. The battery interface adapter maintains a constant electrical connection between battery pack terminals disposed on an end surface of the battery pack and instrument contacts located on a base of the battery interface adapter. A multi-axis restraining system rigidly connects the battery interface adapter to the battery pack when the battery pack is installed within the battery pocket so as to substantially eliminate relative motion therebetween. Preferably, the multi-axis restraining system substantially eliminates relative motion between the terminals and contacts in first and second lateral directions substantially orthogonal to each other and with a longitudinal axis of the battery pack.

In one embodiment, the battery pack includes a first recess open at the end surface while the multi-axis restraining system comprises a corresponding first protrusion extending from the battery interface adapter substantially parallel with the longitudinal axis of the battery pack and aligned with the first recess. The first recess and first protrusion are constructed and arranged to interoperate to prevent motion of the battery pack in at least the first lateral direction. Preferably, the battery pack includes a second recess open at the end surface and, similarly, the multi-axis restraining system includes a corresponding second protrusion extending from the battery interface adapter substantially parallel with the longitudinal axis and aligned with the second recess. The second recess and second protrusion are constructed and arranged to interoperate to prevent motion of the battery pack at least the second lateral direction. Either or both recesses may have disposed therein a battery terminal. In such an embodiment, the opposing contact of the battery interface adapter is disposed on the corresponding protrusion.

In one embodiment, the multi-axis restraining system substantially eliminates relative motion between the terminals and the contacts in the longitudinal axis of the battery pack as well. In this embodiment, the multi-axis restraining system includes an axial restraining subsystem that biases the battery pack and battery interface adapter towards each other. The axial restraining system may include a spring interposed between a stationary surface located on a side of the battery interface adapter opposite the first and second protrusions, and the battery interface adapter. The spring provides a spring force against the battery interface adapter substantially parallel to the longitudinal axis toward the battery pack. The axial restraining subsystem also includes a latching mechanism disposed on the instrument at an open end of the battery pocket that removably secures the battery pack within the battery pocket. The spring and the latching mechanism bias the battery pack and the battery interface adapter together. The latching mechanism may be any well known latching device, such as a door or cantilevered latching arm.

Importantly, rather than being rigidly connected to the instrument, the battery interface adapter is free to travel a predetermined distance in each of the orthogonal axes. In one embodiment, the multi-axis restraining system further comprises pairs of opposing tracks for providing a limited range of movement of the base in at least the first and second lateral directions.

In another aspect of the invention a defibrillator is disclosed. The defibrillator may use an elongate battery pack having four substantially parallel elongate side surfaces defining a longitudinal axis, opposing first and second end surfaces each adjacent to the four side surfaces, a first recess disposed in a first side and front end surfaces, and a pair of terminals disposed on the first end surface. The defibrillator includes a frame defining a battery pocket constructed and arranged to operatively receive the battery and a battery interface adapter disposed within the battery pocket so as to contact the front end surface when the battery is installed in the battery pocket. The battery interface adapter includes a base, a pair of contacts disposed on the base for electrically contacting the pair of terminals, and a first protrusion extending from the base substantially parallel with the battery longitudinal axis. The first protrusion is constructed and arranged to mate with the first recess so as to prevent lateral motion of the battery pack along a first lateral axis substantially orthogonal to the longitudinal axis in a plane defined by the protrusion.

In one embodiment, the battery includes a second recess disposed in a surface of a second side orthogonal to the first side. In a particular embodiment, one of the battery terminals is disposed within the second recess. In this embodiment, the battery interface adapter also includes a second protrusion constructed and arranged to mate with the second recess so as to prevent lateral motion of the battery pack in a second lateral axis substantially orthogonal to the battery longitudinal axis and the first lateral axis. An instrument contacts corresponding to the battery terminal mounted in the second recess is disposed on the second protrusion so as to contact the battery contact when the battery pack is installed.

To further insure a rigid electrical connection along the longitudinal axis, a spring is interposed between the base and a stationary surface located adjacent to a side of the base opposite the first protrusion to provide a spring force against the base substantially parallel to the longitudinal axis, urging the battery interface adapter and battery against a latching mechanism movably mounted to extend into the battery pocket opening to engage a latching recess at a second end surface of the battery.

To further eliminate relative motion between the battery terminals and instrument contacts, the battery interface adapter is allowed to float or travel with the battery when the battery travels within the battery pocket due to shock or vibration. In one embodiment, opposing pairs of tracks configured to receive the substantially planar base are provided. Each pair of opposing tracks is substantially parallel with one of the first and second lateral axes and supports the base such that the battery interface adapter may travel with the battery pack along the first and second lateral axes. The tracks preferably have a width that is somewhat larger than the thickness of the base to enable the battery interface adapter to travel with the battery along the longitudinal axis.

In a further aspect of the invention, a multi-axis restraining system is disclosed. The multi-axis restraining system rigidly connects instrument contacts mounted on a battery interface adapter disposed within a battery pocket of an instrument with terminals mounted on an elongate battery pack. The battery pack defines a z axis substantially parallel with a longitudinal axis of the battery pack and x and y axes substantially orthogonal to each other and to the z axis. Due to the tolerances with which the battery pack and battery pocket are manufactured, within the battery pocket, the battery pack has a first range of motion along the z axis, a second range of motion along the y axis and a third range of motion along the x axis. To prevent relative movement between the battery contacts and the instrument terminals, the multi-axis restraining system rigidly connects the battery contacts and instrument terminals and provides the battery interface adapter with a fourth range of motion along the z axis greater than or equal to the first range of motion along the z axis, a fifth range of motion along the y axis greater than or equal to the second range of motion along the y axis, and a sixth range of motion along the x axis greater than or equal to the third range of motion along the x axis.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

DETAILED DESCRIPTION

The present invention is a multi-axis restraining system for releasably restraining a battery pack installed in an instrument battery pocket such that the battery terminals and instrument contacts are rigidly secured to and travel with each other. Importantly, the present invention significantly eliminates relative motion between the battery terminals and instrument contacts, substantially eliminating welding and fretting of the contacts and terminals.

In certain aspects of the invention, a battery interface adapter incorporating one or more components of such a multi-axis retraining system is disclosed. It should be understood from the following description that the present invention may be implemented in other portions of the implementing instrument. Further, in the illustrative embodiment described below, the instrument in which the present invention is implemented is a portable defibrillator, often referred to as an external defibrillator due to its use external to a patient's body. It should be understood, however, that any device utilizing an electric current provided by a battery or battery pack (generally herein referred to as a battery pack) may implement the present invention.

Figure 1:
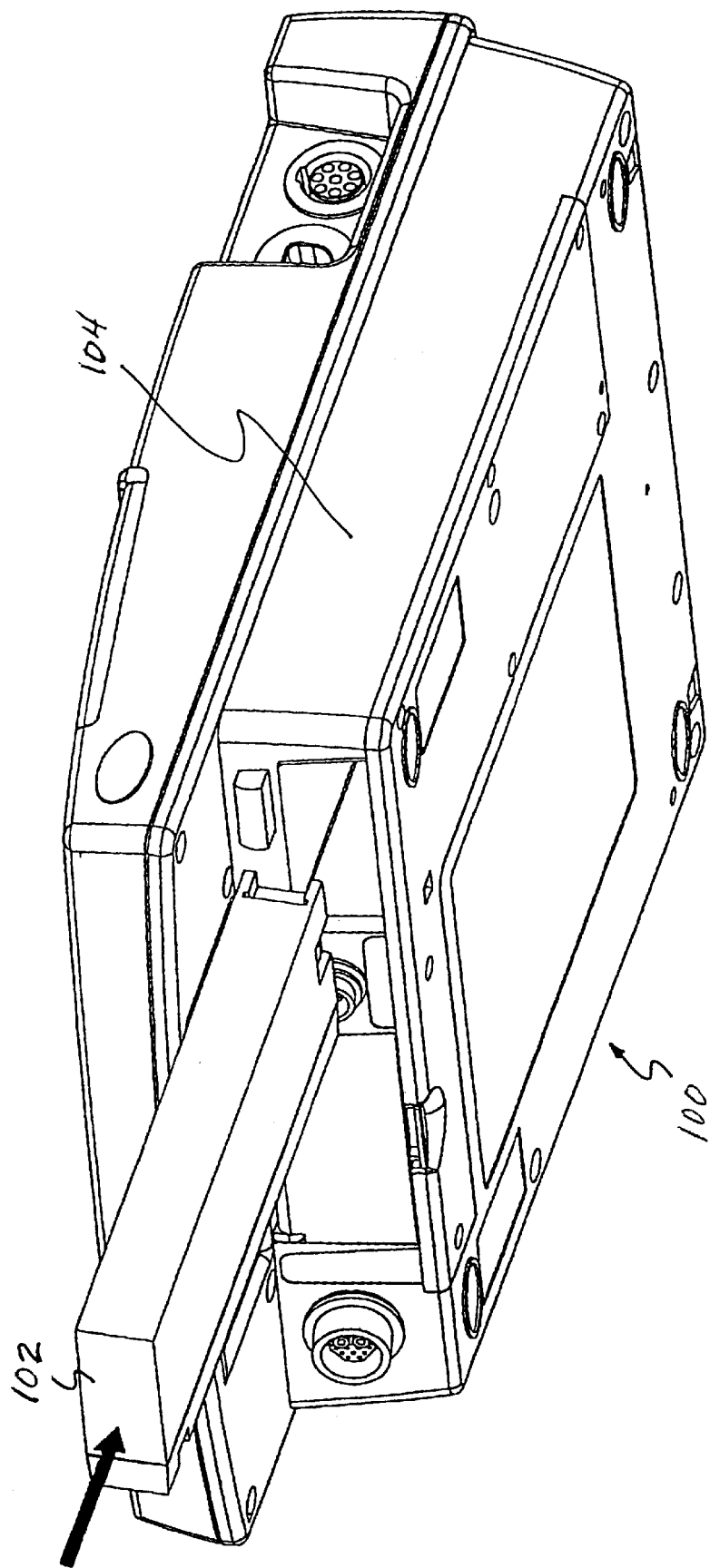
FIG. 1 is a perspective view of a defibrillator suitable for implementing one embodiment of the present invention.
Figure 2:
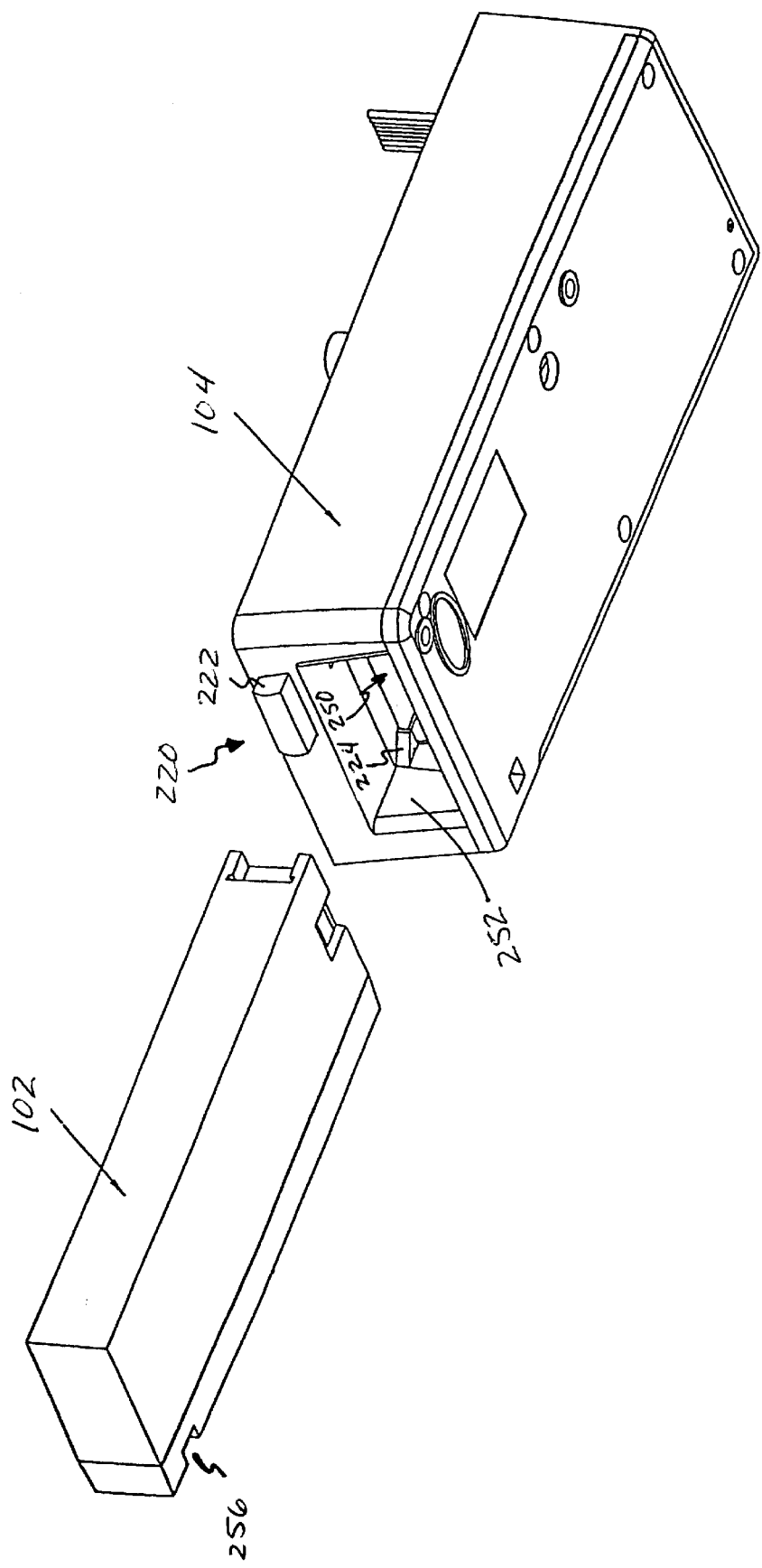
FIG. 2 is a perspective view of an exemplary battery pocket suitable for implementing the multi-axis restraining system of the present invention to rigidly yet releasably secure the battery pack within the battery pocket.
Figure 3:
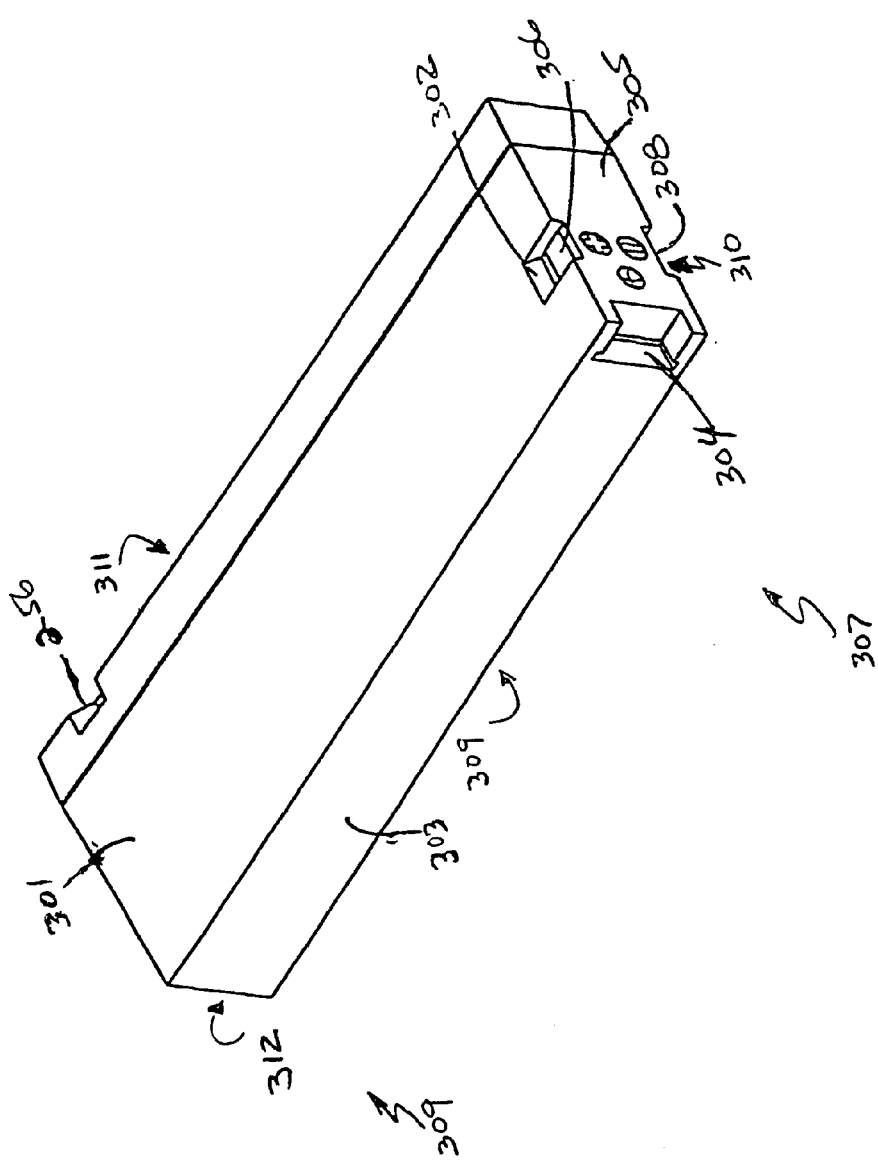
FIG. 3 is a perspective view of a battery pack suitable for being secured with the battery pocket illustrated in FIGS. 1 and 2.

FIG. 1 is a perspective view of a defibrillator suitable for implementing the present invention. Portable defibrillator 100 may be, for instance, model 3500B automatic external defibrillator (AED) available from an Hewlett-Packard Company, Andover, Massachusetts, USA. As is well known in the art, a replaceable battery pack 102 is electrically and mechanically mounted in a battery pocket 104 of defibrillator 100. Battery pocket 104 implements the multi-axis restraining system of the present invention to rigidly yet releasably secure battery pack 102 to instrument contacts mounted within battery pocket 104. FIG. 2 is a perspective view of battery pocket 104 shown as a stand-alone unit. FIG. 3 is a perspective view of battery pack 102 suitable for being secured with battery pocket 104 illustrated in FIG. 1 through the implementation of the multi-axis restraining system of the present invention.

Figure 4:
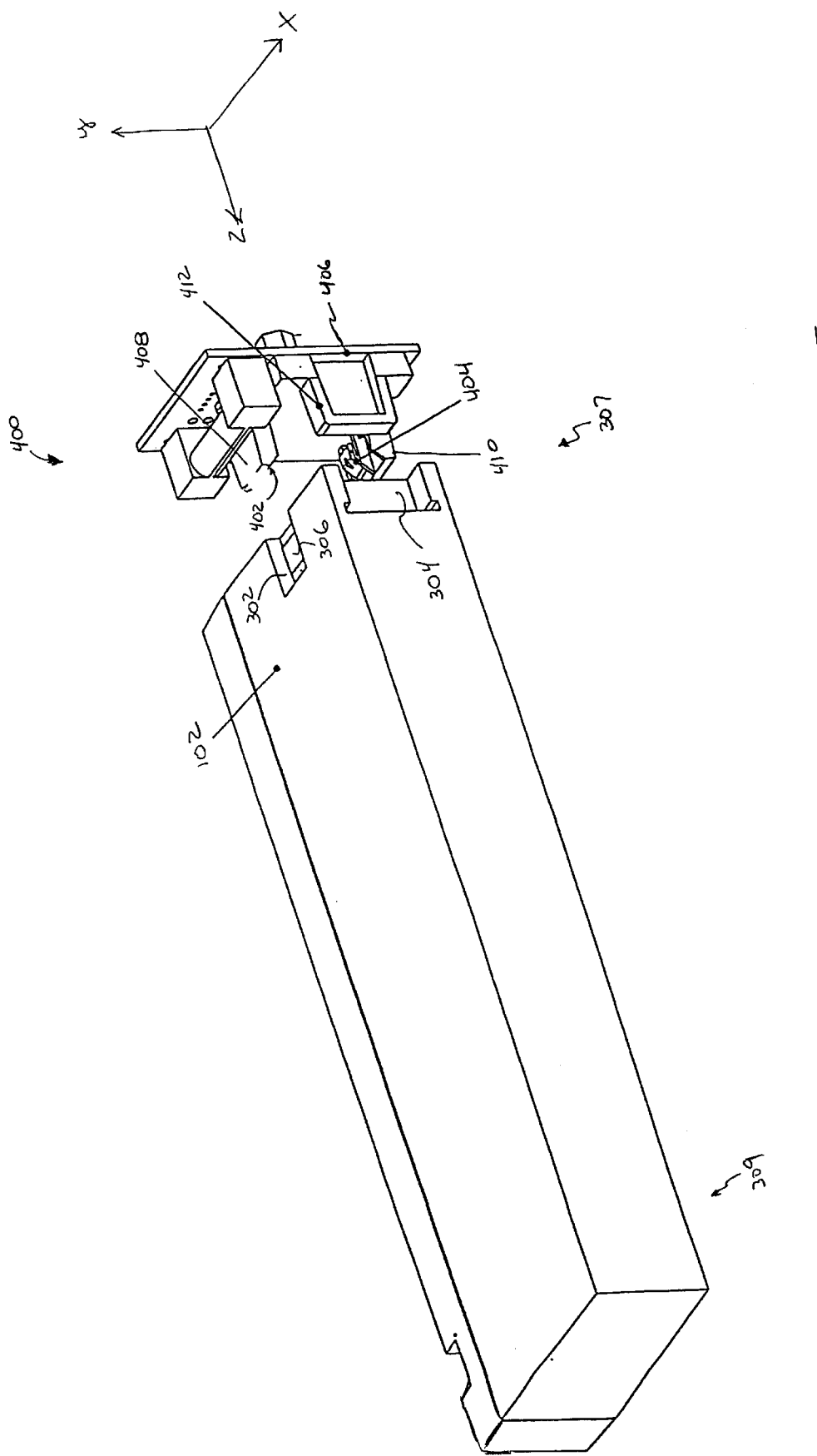
FIG. 4 is a perspective view of one embodiment of the multi-axis restraining system of the present invention mounted in a battery interface adapter located at an end of the battery pocket illustrated in FIG. 2 to electrically and mechanically interface with the battery pack illustrated in FIGS. 1–3.
Figure 5:
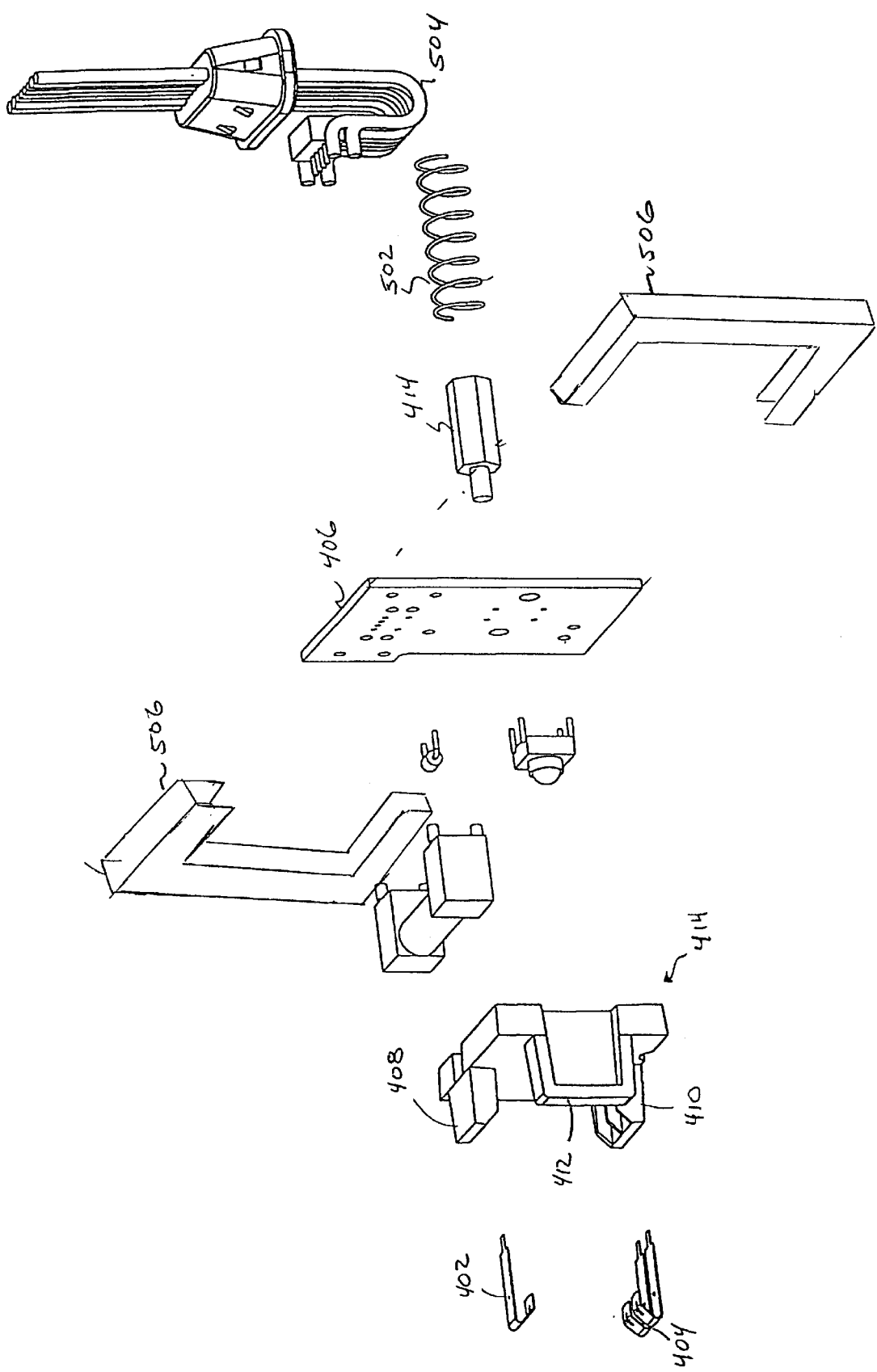
FIG. 5 is an exploded perspective view of the battery interface adapter illustrated in FIG. 4.

FIGS. 4 and 5 are a perspective and exploded view, respectively, of one embodiment of the multi-axis restraining system of the present invention the components of which are primarily mounted on a battery interface adapter located at an end of battery pocket 104 to electrically and mechanically interface with battery pack 102. FIG. 4 also shows the x, y, and z axes as defined herein. The z axis is substantially parallel with the longitudinal axis of elongate battery pack 104. The x and y axes are orthogonal to each other and to the z axis, as shown.

As is common with many instruments which utilize battery packs, battery pocket 104 includes a sleeve 250 terminating in an opening 252 through which battery pack 102 is inserted into sleeve 250. Battery pack 102 includes a positive terminal 306 and negative terminal 308 while battery interface adapter 400 includes a positive battery contact 402 and negative battery electrical contact 404. As is well known in the art, battery pocket 104 is designed to physically constrain and limit the range of motion of battery pack 102. However, as noted, due to the tolerances under which battery pack 102 and battery pocket 104 are manufactured, battery pack 102 may undergo slight motion ("micro-motion") when defibrillator 100 is subject to shock and vibration. This, as noted, causes welding and fretting of contacts 402, 404 and terminals 306, 308. To prevent this from occurring, the multi-axis restraining system of the present invention rigidly secures battery pack 102 against battery interface adapter 400, substantially eliminating relative motion between battery pack 102 and battery interface adapter 400, preferably in the x, y, and z axes.

The multi-axis restraining system also allows battery pack 102 and battery interface adapter 400 to travel with each other when subject to shock and vibration. The range of motion provided for battery interface adapter 400 along each of the axes is greater than that available to battery pack 102, enabling battery interface adapter 400 to "float" with battery pack 102. Thus, battery pack 102 and adapter 400 vibrate and undergo micro-motion as a single, integral unit. This enables the present invention to maintain a substantially constant and complete electrical contact between the two in environments wherein the defibrillator 100 is subject to shocks and vibration and other environmental conditions that may cause micro-motion of battery pack 102. This reduces arcing caused by the momentary disruption of the electrical connection between battery pack 102 and battery interface adapter 400 and the subsequent fretting. In addition, this allows a larger, heavier battery pack 102 to move without straining or breaking the smaller, more fragile components mounted in battery pocket 104.

Battery pack 102 is an elongate battery pack having four elongate sides, two of which, 301, 303, are shown in the perspective view of FIG. 3. In the orientation shown in FIG. 3, side 301 is referred to as top side 301 and side 303 is referred to as right side 303. It follows then that the side opposite top side 301 (not shown) is referred to herein as the bottom side 309 while the side opposite right side 303 (also not shown) is referred to as left side 311. A front end side 305 at a front end 307 of battery pack 102 mates with battery interface adapter 400 when battery pack 102 is installed in battery pocket 104. A rear end side 312 (not shown) at rear end 309 is exposed to the operator when installed in defibrillator 100.

In the illustrative embodiment, battery pack 102 includes a number of recesses on its side surfaces. Certain recesses have disposed therein battery terminals while others do not. Specifically, a recess 302 formed in the surfaces of top side 301 and front end side 305 houses positive terminal 306 while a recess 310 formed in the surfaces of bottom side 309 and front end side 305 houses negative terminal 308. In accordance with one embodiment of the present invention, and as will be described in detail below, a recess 304 is also formed in the surface of right side 303 and front end side 305. As should be apparent, recesses formed in front end side 305 and another side 301,303,309,311 can mate with properly aligned and dimensioned protrusions extending into sleeve 250 of battery pocket 104. In this illustrative embodiment, such protrusions reside on battery interface adapter 400 which, as noted, is mounted within battery pocket 104.

Referring to FIGS. 4 and 5, battery interface adapter 400 includes protrusions extending from a base 406 into battery pocket 104. These protrusions, also commonly referred to as extensions, arms and the like, are aligned with recesses 302 and 310, respectively, and are dimensioned to mate with the corresponding recess when battery pack 102 is installed in battery pocket 104. As used herein, a recess and corresponding protrusion are dimensioned such that the protrusion easily slides into the corresponding recess as battery pack 102 is installed in battery pocket 104. As one skilled in the art would find apparent, the dimensions of the recess must define a region of space that is larger, and preferably just slightly larger, than the dimensions of the corresponding protrusion so that the two may mate securely. That is, a protrusion and corresponding recess reside generally in a plane defined by the width of the protrusion. The recess and protrusion are configured so that, when mated, they interoperate to substantially eliminate relative movement in that plane in at least a direction lateral to a longitudinal axis of the protrusion which in this embodiment is substantially parallel with the longitudinal axis of the battery.

It is also preferable that the recess and protrusion are configured to minimize relative movement in the plane in a direction parallel with the longitudinal axis of the protrusion. This arrangement enables the recess and corresponding protrusion to interoperate to prevent relative motion between battery pack 102 and battery interface adapter 400 when battery pack 102 is installed in battery pocket 104. This is described in further detail below. For ease of description, a corresponding recess and protrusion are sometimes referred to herein as a protrusion/recess pair. The multi-axis restraining system of the present invention is preferably implemented to take advantage of the currently existing recesses in a standard battery pack. In the illustrative embodiment, battery pack 102 is a Panasonic battery model LC-TA122P battery pack commonly used in video camcorders and other consumer electronic devices. Thus, in the embodiment illustrated in FIGS. 4 and 5, there are three protrusions extending from battery interface adapter 400. A top protrusion 408 and bottom protrusion 410 support positive and negative contacts 402 and 404, respectively. Protrusions 408 and 410 each has a longitudinal axis substantially parallel with the z axis, and reside in planes defined by their width. As shown in FIG. 4, both top and bottom protrusions 408 and 410 reside in planes parallel to the xz plane. Protrusions 408 and 410 are aligned with battery pack recesses 302 and 310, respectively, and are each dimensioned to mate with the corresponding recesses as described above. Top and bottom protrusion pairs 408,302 and 410,308 are utilized to minimize relative movement along the x axis. When mated, positive contact 402 and negative contact 404 are electrically connected to positive terminal 306 and negative terminal 308, respectively. As noted, a third protrusion 412 is provided on battery interface adapter 400. This protrusion, referred to as right side protrusion 412, is aligned with recess 304 and dimensioned to mate with recess 304 when battery pack 102 is installed in battery pocket 104. Protrusion/recess pair 412/304 prevents relative motion of battery pack 102 and adapter 400 in at least the y axis. As shown best in FIG. 5, protrusions 408, 410 and 412 are formed in a single unitary assembly 414 that is mounted on base 406.

Battery pack 102 and battery interface adapter 400 preferably include at least 2 protrusion/recess pairs substantially orthogonal to each other and to the z axis to minimize relative movement between battery pack 102 and battery interface adapter 400 along the x and y axes. It should be understood that additional or alternative recesses may be formed in battery pack 102 with corresponding protrusions provided on adapter 400 to provide similar functionality. For example, only a single protrusion/recess pair 408,302 or 410,310 may be used to restrain relative motion along the x axis.

It should also be understood that other battery packs such as Panasonic battery model nos. LCT-1812P, LCT-1912AP, and LCS-2012P may be used. In such embodiments, other configurations of the multi-axis restraining system would be implemented to support such alternative battery packs. Further, non-standard or specialty battery packs may also be used. In such cases, recesses similar to or different from those described above may be formed in the surfaces of the front end and other sides of battery pack 102. It would be preferable that these recesses be formed on orthogonal sides such as top and right side, bottom and left side or other side combinations. As in the illustrative embodiments, if protrusions are necessary for performing other functions (as in providing a extension arm for contacts 402, 404 above) then it is preferable that such protrusions also be used for the multi-axis restraining system if they can be configured to mate in the manner described above. Again, however, any combination of protrusion/recess pairs may be used. In addition, two pairs as described above may not be necessary in certain embodiments if the battery pack is otherwise restrained in a particular axis. Also, various orientations of protrusion/recess pair may be used. For example, in an alternative embodiment, a recess formed in the surface of front end side 305 may be configured to interoperate with a properly sized, dimensioned and oriented protrusion extending from the adapter 400 that restrains relative motion of battery pack 102 in both the x and y axes. These and other configurations are considered to be included in the scope of the present invention.

Base 406 is preferably a printed circuit board (PCB) that is electrically connected to contacts 402 and 404, as well as other components of battery interface adapter 400 not relevant to the present invention. Contacts 402, 404 are mounted in channels formed in a side of protrusions 408, 410 facing battery terminals 306, 308, and have extension arms which extend through the unitary assembly 414 to be mechanically and electrically secured to printed circuit board 406.

As noted, the multi-axis restraining system rigidly secures battery pack 102 to battery interface adapter 104 and, therefore, rigidly secures battery terminals 306,308 to instrument contacts 402,404, respectively. In the illustrative embodiment, right protrusion/recess pair 412,304 reside in a yz plane and prevent relative movement of battery pack 102 and battery interface adapter 400 along the y axis. Top protrusion/recess pair 408, 302 or bottom protrusion/recess pair 410, 310 reside in a xz plane and prevent relative movement of battery pack 102 and battery interface adapter 400 along the x axis. As noted, it is also preferable that these protrusion/recess pairs also limit the motion of battery pack 102 along the z axis toward battery interface adapter 400 when subject to shock and vibrations. Such relative motion is prevented by front end side 305 abutting assembly 414 and, preferably, by a end of the protrusion simultaneously abutting a far interior wall of the corresponding recess.

However, since in this embodiment the recesses are essentially rectangular recesses open on front end side 305, such an arrangement cannot prevent relative motion of battery pack 102 and adapter 400 along the z axis in a direction away from adapter 400. In accordance with the present invention, relative movement in this direction along the z axis is limited by an axial restraining subsystem that biases battery 102 and battery interface adapter 400 against each other. This bias is the result of a force applied along the z axis against rear end side 312 urging battery pack 102 toward adapter 400, and a force applied along the z axis against adapter base 406 urging adapter 400 toward battery pack 102.

In the illustrative embodiment, the axial restraining subsystem includes a spring 502 and latching mechanism 220. Spring 502 is mounted on a stand off member 414 mounted to the rear face of printed circuit board 406. As shown in FIGS. 4 and 5, the rear face of PCB base 406 is the side opposing the side from which protrusions 408, 410 and 412 extend. Spring 502 is compressed against a stationary reference surface (not shown) and the rear surface of base 406, providing a predetermined force against base 406 to urge base 406 along the z axis toward battery pack 102. As one skilled in the relevant art would find apparent, other devices and structures may be used to urge battery interface adapter 400 toward battery 102.

In one embodiment of the present invention, latch mechanism 220 is a cantilevered latch attached at opening end 252 of battery pocket 104 for holding battery pack 102 within battery sleeve 250 of pocket 104. A spring released latching arm 224 extends into sleeve 250 to engage a latching recess 256 on a side of battery pack 102. Depression of release switch 222 on the exposed face of pocket 104 causes the retraction of latching arm 224, disengaging arm 224 from recess 256. Battery pack 102 is then ejected from battery pocket 104 under a force of another spring (not shown). The structure and operation of latching mechanism 220 is considered to be well known in the art.

In an alternative embodiment of the present invention, latch mechanism 220 could be any mechanism for maintaining battery pack 102 within battery pocket 104. For example, latching mechanism 220 could be a door movably mounted on defibrillator 100 that covers opening 252 of battery pocket 104. Many other latching mechanisms that releasably secure a battery pack in an associated battery pocket may be used. Also, in alternative embodiments, the axial restraining system may include other structures and techniques such as additional releasable latches mounted on battery interface adapter 400, protrusions 408, 410, 412, or elsewhere, and may be configured to operate with latching mechanism 220.

Thus, the multi-axis restraining system rigidly secures battery pack 102 and battery interface adapter 400 to each other, minimizing the relative movement between them. However, the anticipated operational environment of defibrillator 100 is harsh and may expose defibrillator 100 to vibrations and shock that cause micro-motion of battery pack 102 despite use of the above restraining elements of the present invention, particularly if battery pack 102 is large or has a significant mass. In accordance with one preferred embodiment of the invention, battery interface adapter 400 is loosely secured in battery pocket 104 so that it may travel slightly along the x, y and z axes. As a result, the multi-axis restraining system allows battery pack 102 and adapter 400 to travel with each other when subject to shock and vibration. That is, battery pack 102 and adapter 400 vibrate and undergo micro-motion as a single, integral unit while battery pack 102 is installed in battery pocket 104. This further significantly minimizes micro-motion of battery pack 102 relative to battery interface adapter 104, thereby providing additional protection against preventing welding and fretting of contacts 306, 308 and terminals 402, 404.

In the illustrative embodiment, battery interface adapter 400 is loosely secured within battery pocket 104 by mechanical tracks 506. Tracks 506 are attached to an interior wall (not shown) of battery pocket 104. It is important to note that tracks 506 are not physically attached to printed circuit board 406. Rather, tracks 506 have a generally a U-shaped cross-section defining a channel suitable for receiving PCB base 406, serving as guideways along which base 406 travels in the x and y axes. Preferably, tracks 506 have a channel that is wider than the thickness of base 406, enabling the integral battery/adapter unit to vibrate along the z axis as well.

As shown in FIG. 5, pairs of opposing tracks 506 are implemented as two facing C-shaped tracks positioned substantially orthogonal to the z axis at the rear of battery pocket 104. Tracks 506 are positioned a sufficient distance apart from each other to loosely restrain the printed circuit board 406 in both the x and y direction while preventing base 406 from leaving tracks 506. In addition, the channel is of sufficient depth to continually restrain base 406 throughout its entire range of motion. The range of motion available to battery interface adapter 400 is greater than that of battery pack 102 so as not to physically inhibit movement of, or cause excess drag on, battery interface adapter 400. Instead, the limits of movement are determined by the relative dimensions of battery pack 102 and sleeve 250 of battery pocket 104.

An electrical cable 504 is attached to printed circuit board 406 for transferring current, data, etc. from adapter 400 to other defibrillator components. In accordance with the present invention, cable 504 has a length which is greater than that necessary to connect PCB base 406 with such other defibrillator components. Such excess length provides slack so that the cable can follow the movement of PCB base 406 as battery pack 102 and adapter 400 travel due to shock and vibration. Cable 504 provides a minimum amount of drag, minimizing any loss of the floating characteristic and preventing damage to the electrical connections.

As is well known in the art, various components and switches may be included on battery interface adapter 400. For example, fuses, thermistors, or switches, and the like may be used in order to sense a physical state of the battery to interface with corresponding structures on the battery interface adapter 400. These and other features of battery interface adapter 400 and battery pack 102 are described in commonly owned U.S. utility patent application Ser. No. 09/191,685 entitled "Battery Pack Chemistry Detection and Identification System and Method," filed concurrently herewith, and naming as inventors Jonathan Neal Andrews and Gregory D. Brink; and commonly owned U.S. utility patent application Ser. No. 09/192,116 entitled "System and Method for Detecting Battery Pack Components," filed concurrently herewith, and naming as inventors Jonathan Neal Andrews, Gregory D. Brink and David Lynn Burton, the disclosures of which are hereby incorporated by reference in their entirety.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A battery interface adapter for use in an instrument battery pocket for maintaining a constant electrical connection between non-snap battery pack terminals disposed on an end of a battery pack and instrument contacts located on a base of the battery interface adapter, said battery pack having elongate sides substantially parallel with a longitudinal axis thereof, opposing front and rear sides adjacent to said elongate sides, and a first recess in a surface of a first elongate side and said front side, said battery interface adapter, comprising:

a multi-axis restraining system that rigidly connects the battery interface adapter to the battery pack when the battery pack is installed within the battery pocket to substantially eliminate relative motion between said terminals and said contacts in a first and second lateral directions substantially orthogonal with respect to each other and with a longitudinal axis of the battery pack, wherein said multi-axis restraining system comprises a corresponding first protrusion extending from said battery interface adapter substantially parallel with said longitudinal axis and aligned with said first recess, said first recess and first protrusion constructed and arranged to prevent motion of the battery pack in said first lateral direction within a plane defined by said first protrusion; and a biasing element disposed between a wall of the instrument battery pocket and the base of the battery interface adapter.

2. The battery interface adapter of claim 1, wherein the battery pack further includes a second recess in a surface of a second elongate side substantially orthogonal to said first elongate side and said front side, and wherein said multi-axis restraining system further comprises a corresponding second protrusion extending from said battery interface adapter substantially parallel with said longitudinal axial direction and aligned with said second recess, said second recess and second protrusion constructed and arranged to interoperate to prevent motion of the battery pack in said second lateral direction within a plane defined by said second protrusion.

3. The battery interface adapter of claim 1, wherein the battery pack further includes a third recess in a surface of a third elongate side substantially parallel to said first elongate side and said front side, wherein said multi-axis restraining system further comprises:

a corresponding third protrusion extending from said battery interface adapter substantially parallel with said longitudinal axial direction and aligned with said third recess, said third recess and third protrusion constructed and arranged to prevent motion of the battery pack in said first lateral direction within a plane defined by said third protrusion wherein a second terminal of the battery pack is disposed within said third recess and an associated instrument contact of said battery interface adapter is disposed on said corresponding third protrusion.

4. The battery interface adapter of claim 1, wherein said multi-axis restraining system further comprises:

an axial restraining system constructed and arranged to substantially eliminate relative motion between said terminals and said contacts along a longitudinal axis of the battery pack.

5. A battery interface adapter for use in an instrument battery pocket, comprising:

a base including a printed circuit board having traces terminating in instrument contacts;

a multi-axis restraining system that rigidly connects the instrument contacts to battery pack terminals when a battery pack is installed within the battery pocket to substantially eliminate relative motion between the battery pack terminals and the instrument contacts; and opposing tracks secured in the instrument battery pocket that constrain the base by providing a limited range of movement in at least first and second lateral directions with respect to the instrument battery pocket.

6. A battery interface adapter for use in a battery pocket, the battery interface adapter, comprising:

a base having a plurality of instrument contacts to electrically couple a battery disposed within the battery pocket;

a plurality of opposing tracks defining a channel suitable for receiving the base, the opposing tracks serving as guides constraining movement of the base within the battery pocket;

a multi-axis restraining system; and a means for biasing the base from a surface of the battery pocket wherein the battery interface adapter and a battery pack move as a unit when the battery pack is disposed within the battery pocket.

7. The adapter of claim 6, wherein the base comprises a printed circuit board electrically and mechanically coupled to an electrical instrument.

8. The adapter of claim 6, wherein the opposing tracks comprise a U-shaped cross section for receiving opposing edges of the base.

9. The adapter of claim 6, wherein the biasing means comprises a spring.

10. The adapter of claim 6, wherein the multi-axis restraining system comprises a plurality of protrusions configured to receive the battery pack.

11. The adapter of claim 6, wherein the plurality of instrument contacts are secured to a plurality of protrusions arranged to electrically couple the battery pack to the base.

* * * * *